307/425 OR 3,801,797

United States Patent [19]

Harris et al.

[11] 3,801,797

[45] Apr. 2, 1974

[54] OPTICAL RADIATION FREQUENCY CONVERTER EMPLOYING PHASE MATCHED MIXTURES OF INERT GASES AND METHOD

[76] Inventors: Stephen E. Harris, 880 Richardson Ct., Palo Alto, Calif. 94306; Andrew H. Kung, Blackwelder 4D, Escondido Village, Stanford, Calif. 94305

[22] Filed: Jan. 29, 1973

[21] Appl. No.: 327,318

[52] U.S. Cl. .............................. 307/88.3, 321/69 R

[51] Int. Cl. .............................................. H02m 5/04

[58] Field of Search ...... 321/69; 307/88.3; 250/199; 325/445

[56] References Cited

UNITED STATES PATENTS 3,699,353 10/1972 Bechtold et al. .................... 307/88.3

*Primary Examiner*—Herman Karl Saalbach

*Assistant Examiner*—Darwin R. Hostetter

*Attorney, Agent, or Firm*—Flehr, Hohbach, Test, Albritton & Herbert

[57] ABSTRACT

An optical radiation frequency converter including a cell containing a phase matched mixture of inert gas atoms, one of which is negatively dispersive and one of which is positively dispersive, and a source of monochromatic radiation of one frequency to be converted to another frequency positioned to project the monochromatic radiation through the cell whereby the phase matched mixture of inert gas atoms converts the radiation from the one frequency to the other frequency.

6 Claims, 4 Drawing Figures

PARTIAL ENERGY DIAGRAM OF XENON

OPTICAL RADIATION FREQUENCY CONVERTER EMPLOYING PHASE MATCHED MIXTURES OF INERT GASES AND METHOD

BACKGROUND OF THE INVENTION

This invention relates generally to an optical radiation frequency converter employing a phase matched mixture of inert gas atoms and method.

It is known to employ non-linear optics to generate harmonic frequencies of input radiation. That is, it is known to employ gases, liquids and solids to which incident radiation of one wavelength is applied and output radiation at a harmonic wavelength is obtained. Phase matching at the two frequencies is known. Armstrong et al. "Interaction Between Light Waves in Non-Linear Dielectric," Physical Review 127, 1918 (1962) suggests phase matching by the admixture of molecular species.

However, most liquids and solids are opaque in the ultra-violet region of the spectrum at wavelengths shorter than about 2,500 Angstroms and thus are not useful in this region. Gas harmonic generators of the prior art have not been useful because of their low efficiency.

In copending application Ser. No. 197,889 entitled "Optical Radiation Frequency Converter and Method," there is described an efficient radiation frequency converter employing a phase matched mixture of metal vapors and inert gases. The system described requires homogeneous mixing of the metal vapor and inert gas, which presents certain practical problems.

OBJECTS AND SUMMARY OF THE INVENTION

It is a general object of the present invention to provide a radiation frequency converter employing a phase matched mixture of inert gases.

It is a further object of the present invention to provide an efficient radiation frequency converter employing a phase matched mixture of inert gases, one of which is negatively dispersive and one of which is positively dispersive.

The foregoing and other objects of the invention are achieved by a radiation converter comprising a cell, a mixture of inert gas atoms one of which is negatively dispersive in said cell and means for projecting monochromatic radiation into said cell whereby the frequency of the input radiation is converted to provide output radiation at another frequency.

DESCRIPTION OF PREFERRED EMBODIMENTS

Figure 1:
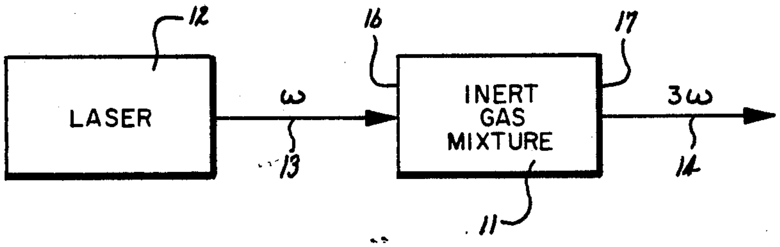
FIG. 1 is a schematic diagram showing a radiation converter associated with a laser.

The radiation converter illustrated in FIG. 1 comprises a gas or vapor cell 11 which is filled with a phase matched mixture of inert gases. A laser 12, whose output radiation frequency $\omega$ is to be converted, directs its coherent monochromatic beam 13 through the cell 11. A beam 14 at three times the frequency, $3\omega$, emerges from the cell. The cell 11 may comprise an opaque elongated envelope portion with windows 16 and 17 disposed at each end. The cell may comprise any other suitable envelope for containing the gases.

The negatively dispersive inert gas to accomplish the third harmonic process is one which has its atomic resonances or group of resonances below and usually relatively close to the third harmonic frequency, $3\omega$, which is to be generated.

The inert gases comprising helium, neon, argon, xenon and krypton have their atomic transition frequencies in the vacuum ultraviolet between about 1,469 A and 500 A; and thus are suitable to provide negative dispersion for converting an incident wavelength shorter than about 4,408 A. This follows since the third harmonic of 4,408 A is at about 1,469 A which is above the longest of these lines which occurs in xenon. The shortest of these lines is that for helium at 500 A. Thus, harmonic generation is possible over the spectral region of 1,469 A to at least 500 A.

A simplified description of the converting process follows. The incident wave at the fundamental frequency $\omega$ is applied at a sufficient power level that its power density corresponds to rather large electric field strengths (typically $10^5$ volts/cm). This strong electric field interacts with the inert gas atoms to generate an electric dipole polarizability. This is the normal (linear) polarization and is enhanced if the fundamental frequency is near any atomic resonance frequency (transition to ground). The generated polarizability referred to above mixes with the incident electric field to generate fluctuations in the atomic population at a frequency twice that of the incident fundamental radiation. The term "fluctuations" in the atomic population must be taken in the general sense to include off-diagonal or mixed-state fluctuations of the density matrix.

It is noted that although the atomic system exhibits fluctuations at a frequency $2\omega$, no radiation at such frequency is possible. For radiation, we must proceed through another non-linear stage of the "internal" atomic interaction. Here, the fluctuations of the atomic population mentioned in the preceding paragraph again mix with the incident electro-magnetic field to generate a dipole polarization at three times the incident or fundamental frequency. This dipole moment then radiates at the third harmonic frequency.

For a concise review, the non-linear atomic process is: electric field at frequency $\omega$ generates dipole polarization at frequency $\omega$; dipole polarization at $\omega$ mixes with the electric field at $\omega$ to generate atomic fluctuations at frequency $2\omega$; atomic fluctuations at $2\omega$ mix with the incident electro-magnetic field to generate dipole polarization at frequency $3\omega$. The dipole polarization at $3\omega$ radiates at the third harmonic frequency.

The formuli for the third order non-linear polarization (the polarization or non-linearity is called third order because three frequencies are required to produce a fourth frequency) are well known in the literature. In general terms, the non-linearity will be strong if there exists strong atomic transitions between a number of different atomic states which have resonant frequencies close to either the fundamental frequency, twice the fundamental frequency, or three times the fundamental frequency. This is the case for inert gases for generation of third harmonic frequencies in the vacuum ultraviolet region of the spectrum. In summary, the key to choosing a gas with a strong non-linearity is that it must have resonant frequencies relatively close to eiher $\omega$, $2\omega$ or $3\omega$ where $\omega$ is the frequency of the incident laser beam to be converted to the third harmonic frequency.

The third order non-linear process in inert gases can also be employed to convert three input frequencies $\omega_1$ $\omega_2$ and $\omega_3$, generating a fourth frequency $\omega_4$. The radiating polarizations will be generated by the non-linear atomic process and the output will be at frequencies $\pm\omega_1 \pm \omega_2 \pm \omega_3$ where the combination frequency is a positive number. Note that as the special case of this process, we have the process where three frequencies are equal and one obtains $3\omega_1$.

The inert gases are mixed in predetermined proportion with one another. The amount of positively dispersive gas is in a ratio with the negatively dispersive gas to make the refractive index at the third harmonic frequency substantially equal to that at the fundamental frequency, whereby the velocity of the waves in the mixture at the two frequencies are substantially equal.

Phase matching in the present invention is accomplished by blending the negatively dispersive inert gas with a normally dispersive inert gas to obtain equal velocities at the fundamental and third harmonic frequencies.

Figure 2:
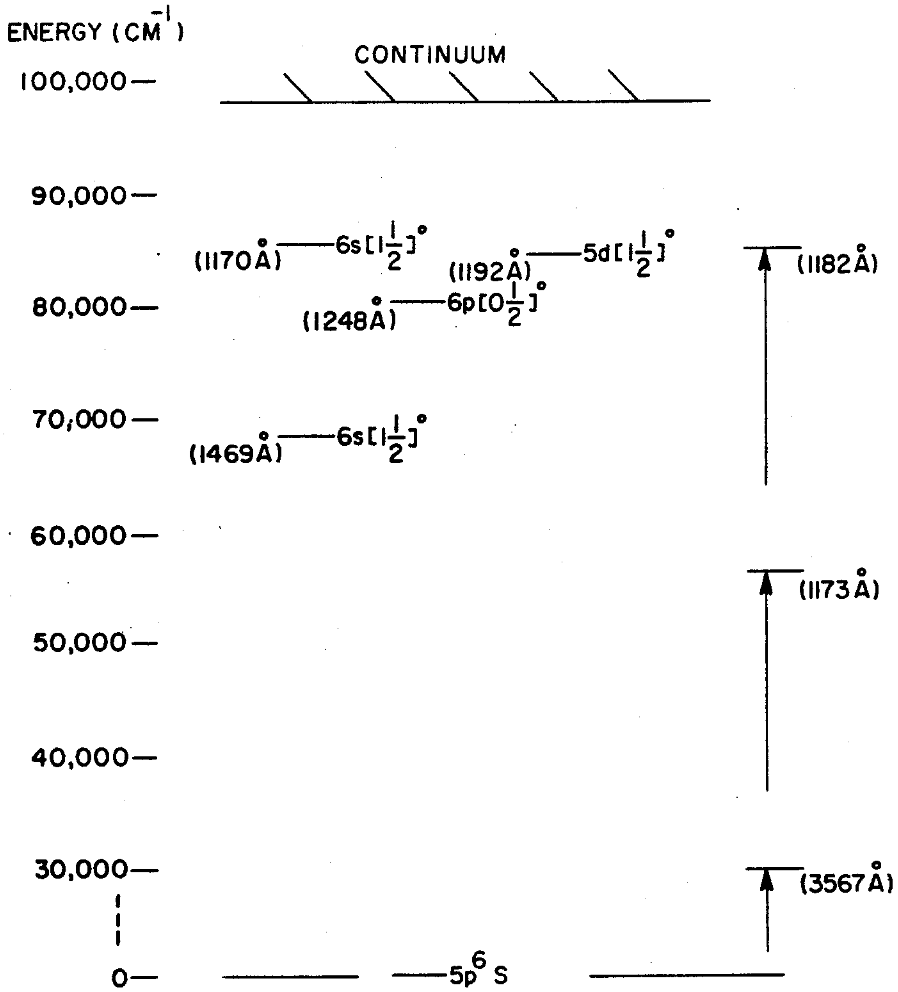
FIG. 2 is a partial energy diagram for xenon.

The two inert gases to be used in this invention are selected so as one is negatively dispersive and one is positively dispersive. Typically, the negatively dispersive agent will be obtained by allowing the third harmonic frequency to lie somewhat above a relatively strong atomic resonance. FIG. 2 shows a partial energy level diagram of xenon. As an example, we consider the tripling process 3,547 A to 1,182 A. It is seen that the 1,182 A frequency lies above the 1,192 A transition in xenon and thus it is expected that xenon will be negatively dispersive for this process. It is clear that if the xenon is mixed with the normally dispersive inert gas with resonance further up into the spectrum such as argon, that there must exist some ratio of argon to xenon such that the refractive index at 3,547 A is equal to the refractive index at 1,182 A.

Figures 3, 4:
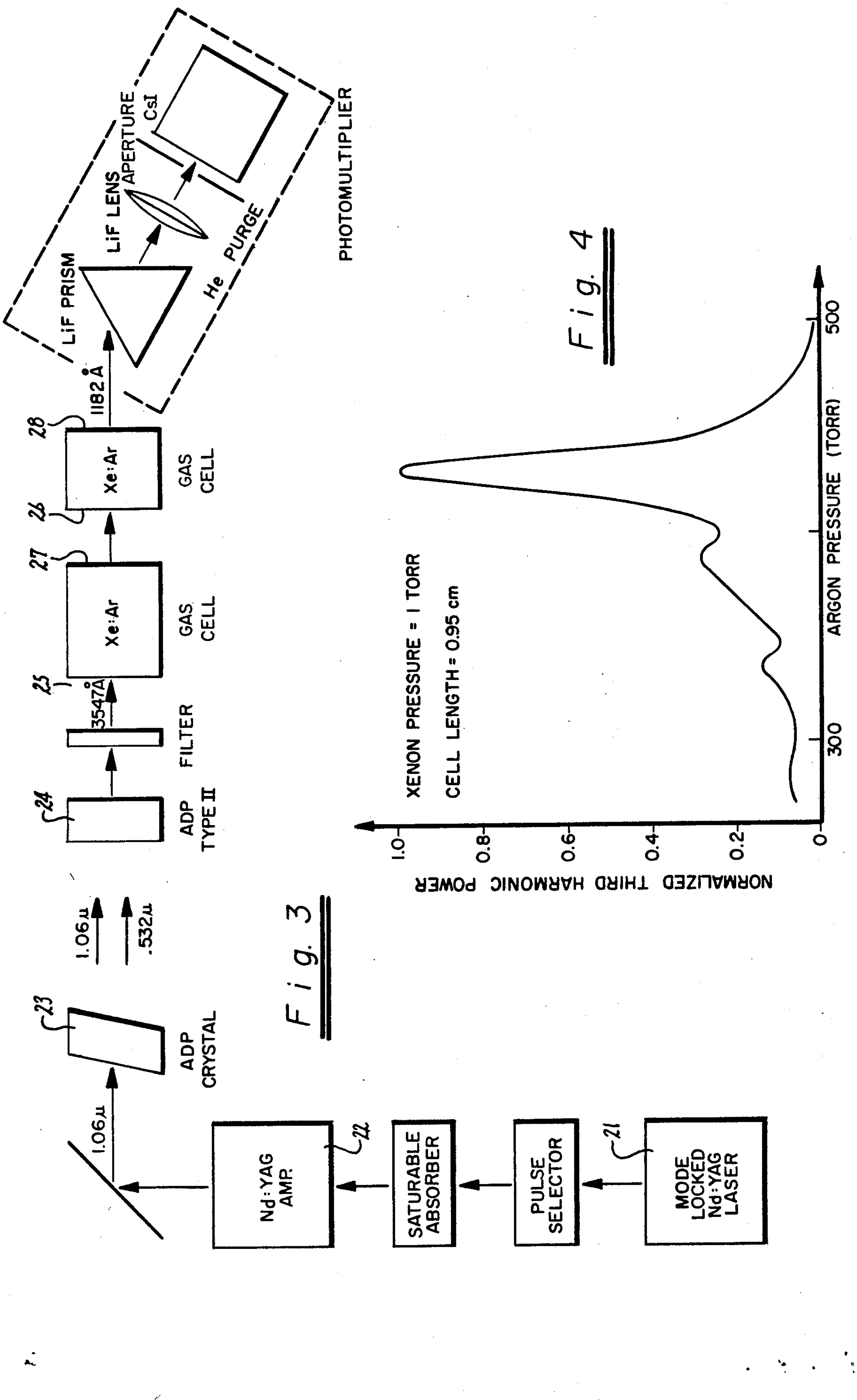
FIG. 3 is a block diagram of apparatus for generating 1,182 A.
FIG. 4 is a normalized diagram showing output power as a function of argon pressure.

Apparatus for conversion of a laser output from 3,547 A to 1,182 A is shown in FIG. 3. The output radiation from a mode locked 1.064$\mu$ Nd:YAG laser 21 is processed to form single pulses which are applied to a Nd:YAG amplifier 22 to yield an estimated peak power of $3 \times 10^8$ watts and a pulse length of 25 picoseconds at 1.064$\mu$. The pulse is frequency doubled in ADP crystals 23 to 5,320 A, and mixed in crystal 24 with the remaining 1.064 $\mu$ radiation to yield 3,547 A. A maximum peak power of $1.3 \times 10^7$ watts is obtained at 3,547 A. Two Xe:Ar gas cells are employed. Each had a quartz input window 25, 26 and a lithium fluoride output window 27, 28. In the example shown, the generated 1,182 A radiation is directed into a helium purged lithium fluoride prism spectrometer for detection. It is apparent that the output could be used for other purposes. Detection is accomplished with a solar blind model EMR 542G photomultiplier with a cesium iodide photocathode. A sensitive lithium tantalate pyroelectric detector can be used for absolute intensity measurements at 1,182 A.

The above apparatus was operated with the laser focused to a confocal parameter of 2.1 cm, and a 0.95 cm long cell was placed at the center of the focus. The xenon pressure was fixed at 1 torr. Generated third harmonic power at 1,182 A was monitored as the argon pressure was gradually increased. Experimental results are shown in FIG. 4. Peak third harmonic power was obtained at an Ar:Xe ratio of 430:1. The Xe pressure was then increased to 5.7 torr, and the experiment was repeated. Peak third harmonic power was again obtained at a ratio of 430:1, and was 2,500 times greater than that obtained with pure Xe. The conversion efficiency for these experimental conditions was 0.13 percent. A further increase in Xe pressure did not yield significantly higher output powers. The ratio of third harmonic power outputs with argon present to that with argon absent, yields a coherence length for pure xenon of −0.033 cm at $10^{17}$ atoms per $cm^3$. The measured conversion efficiency, cell length, and coherence length yield a non-inear susceptibility $\chi^{(3)} = 2.5 \times 10^{-34}$ e.s.u.

To obtain higher conversion efficiencies, the 3,547 A radiation was focused to a confocal parameter of 0.25 cm in the center of a 9.5 cm cell. At an input power of 13 MW the power density on the cell windows was still reasonable, while the density at the focus was about $6.3 \times 10^{12}$ watts/$cm^2$. For these tight focusing conditions, the ratio of Ar to Xe which was necessary to achieve phase matching was reduced to about 50:1. This reduction in ratio is a result of the tighter focusing employed. At an input power of 13 MW, and an optimized Xe pressure of 3 torr, an energy conversion efficiency of 2.8 percent from 3,547 A to 1,182 A is obtained. For these tight focusing conditions, even pure Xe at a pressure of 3 torr, yields a conversion efficiency of 0.9 percent.

In general, to obtain maximum conversion efficiency, it is desirable to work at the highest power density allowed by either breakdown or multi-photon ionization. For the 25 pico-second pulses employed in our experiment, we found that the third harmonic power output varied as the cube of the incident power up to an incident power density of $7 \times 10^{12}$ W/$cm^2$. If the pressure of the Xe is reduced as the square root of the incident energy density, theory predicts that conversion efficiency should increase linearly with input power. This was found to be the case to the limit of our available power. Based on the measured susceptibility, and assuming that theory continues to hold, 20 percent conversion efficiency should be obtained at an input power of about $9.3 \times 10^7$ watts. For this input power the laser should be focused to a confocal parameter of 1.8 cm; and 1.1 torr of Xe, and 28 torr of Ar should be used.

The general technique of phase matched harmonic generation in mixtures of inert gases should be applicable to the spectral region from 1,469 A to at least 500 A. Tripling of the second harmonic of a mode locked ruby laser to yield radiation at 1,157 A should be obtained at a ratio slightly less than that reported here, and with a non-linearity which is approximately the same. By tripling the radiation obtained from dye lasers and frequency doubled dye lasers, high power tunable radiation over much of the vacuum ultraviolet should also be obtainable.

We claim:

1. A radiation converter for converting radiation at one frequency to another frequency comprising a gas cell, a positively dispersive inert gas in said cell, a negatively dispersive inert gas in said cell to form a mixture of inert gases, and a source of monochromatic energy to be converted from one frequency to said another frequency positioned to project radiation through said cell.

2. A radiation converter as in claim 1 wherein said another frequency is the third harmonic of said one frequency.

3. A radiation converter as in claim 1 wherein said gases are selected from helium, neon, argon, xenon and krypton.

4. A radiation converter as in claim 1 wherein said negatively dispersive inert gas is xenon and said positively dispersive inert gas is argon and said another frequency is above the resonance frequency of said negatively dispersive inert gas.

5. A radiation converter as in claim 1 wherein the ratio of the negatively dispersive inert gas atoms to positively dispersive inert gas atoms is such that the velocity of radiation at the one frequency equals that at the another frequency.

6. The method of converting radiation at one frequency of radiation at a third harmonic frequency which comprises the steps of selecting a negatively dispersive inert gas which has atomic resonances below said third harmonic frequency, mixing said inert gas with a positively dispersive inert gas, and selecting the ratio of said negatively and positively dispersive inert gases such that the velocity of radiation through the medium at the one frequency equals that at the third harmonic frequency.

* * * * *